United States Patent [19]
Kusakabe et al.

[11] Patent Number: 6,102,723
[45] Date of Patent: *Aug. 15, 2000

[54] ELECTRICAL CARD CONNECTOR

[75] Inventors: Toshihito Kusakabe, Ibaraki; Yoshihiro Kaneko, Yao, both of Japan

[73] Assignee: Hosiden Corporation, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/781,025

[22] Filed: Jan. 9, 1997

[30] Foreign Application Priority Data

Feb. 14, 1996 [JP] Japan .................................. 8-026775

[51] Int. Cl.⁷ .................................................. H01R 13/629
[52] U.S. Cl. ........................................... 439/267; 439/260
[58] Field of Search .................................. 439/260, 261, 439/267, 630, 635; 235/482, 483, 480

[56] References Cited

U.S. PATENT DOCUMENTS

| | | | |
|---|---|---|---|
| 4,795,897 | 1/1989 | Chalendard | 439/260 |
| 4,839,509 | 6/1989 | Yasuma et al. | 439/260 |
| 4,904,852 | 2/1990 | Mita et al. | 439/260 |
| 4,961,710 | 10/1990 | Komatsu | 439/260 |
| 5,259,777 | 11/1993 | Schuder et al. | 439/260 |

*Primary Examiner*—Hien Vu
*Attorney, Agent, or Firm*—Jones, Tullar & Cooper, P.C.

[57] ABSTRACT

The invention relates to an electrical card connector (hereinafter referred to as "connector") which is used for a card C such as an IC card. The invention proposes a structure in which scratches are not formed on the surface of the card when the card C is inserted into the connector or when the card C is ejected from the connector. The connector has a body, a slider, and a cover. The slider is disposed so as to be slidable. The connector has a contact position regulating mechanism which, when the slider is in an initial position, retracts a contact to the outside of a card insertion space S1 and, when the slider reaches a pushed-in position, causes the contact to protrude into the card insertion space S1. When the slider is in the initial position, the contact position regulating mechanism causes the contact to be retracted to the outside of the card insertion space. When the slider is in the pushed position, the contact is caused to protrude into the card insertion space by the function of the contact position regulating mechanism.

12 Claims, 16 Drawing Sheets

ELECTRICAL CARD CONNECTOR

BACKGROUND OF THE INVENTION

1. Field of the Invention

The present invention relates to an electrical card connector, and particularly to an electrical card connector (hereinafter, referred to merely as a "connector") which holds an inserted card and prevents the card surface from being scratched.

A connector of this kind is used for a card such as an IC card. In such a case, the connector is often used especially as a multipolar connector having a number of contact piece members. With this kind of connector, in order to prevent a card which is inserted into a card insertion space of the body of the corner from being accidentally ejected, a measure for holding the card at the insertion position is sometimes taken.

2. Description of the Prior Art

Conventionally, a connector having the following configuration is known. Contact piece members are incorporated into the body which is made of a synthetic resin having an electrical insulating property. Contacts of the contact piece members are elastically in contact with external contacts of a card which is inserted into a card insertion space formed in the body, thereby attaining the electrical connection.

FIG. 21 is a front view schematically showing a prior art connector of this kind. In the figure, 100 and 101 designate the body and a card insertion port, respectively. A required number of contacts 102 of contact piece members attached to the body 100 can be seen from the outside through the card insertion port 101. In other words, the contacts 102 always protrude into a card insertion space formed in the body 100.

FIG. 22 shows a card C such as an IC card which can be used in the connector of FIG. 21. A required number of external contacts 112 are formed so as to have a predetermined pattern in an external contact forming region 110 on the surface of the card C. The external contacts 112 of the card C are counter parts of the contacts 102 of the connector. When the card C is inserted into the card insertion space through the card insertion port 101, the contacts 102 are elastically in contact with the external contacts 112.

In the connector illustrated in FIG. 21, when the card C of FIG. 22 is inserted into the card insertion space, or when the card C is ejected from the card insertion space, the contacts 102 always rub against the surface of the card C by the elasticity of the contact piece members. As a result, scratches 113 such as shown in FIG. 22 are inevitably formed on the surface of the card C.

A connector in which a measure for preventing scratches from being formed on a card is proposed by, for example, Japanese Utility-model Publication No. 7-33401. A connector described in the publication comprises the body and a slider housed in the body. A mechanism for displacing the slider which is pushed by the tip end of the card in a direction toward contacts of contact piece members disposed inside the body is interposed between the body and the slider. In this connector, when the card is inserted or when the card is ejected, the contacts of the contact piece members are not in contact with the surface of the card, so that scratches are not formed on the surface of the card. In addition, the publication describes a measure for holding the card inserted into the body in position.

The measures for preventing scratches from being formed on the surface of the card, and for holding the card inserted into the body in position which are described in the publication are configured by interposing a member which is other than the slider, between the slider and the body. These measures increase the number of components and also the complexity of the structure. Therefore, these measures impede reduction of the production cost of a connector, etc.

SUMMARY OF THE INVENTION

The present invention has been conducted in view of the above-mentioned circumstances.

It is an object of the present invention to provide a connector in which measures are taken in the structure of the body and a slider housed in the body so that scratches can be prevented from being formed on the surface of a card without using any additional member.

It is another object of the present invention to provide a connector in which measures are taken in the structure of the body and a slider housed in the body so that a card inserted into the body can be held in position without using any additional member.

The connector of the present invention which attains the abovementioned objects comprises:

a body having a card insertion space;

a slider which is held by the body so as to be slidable in card inserting and ejecting directions between an initial position on the side of a rear portion of the body and a pushed-in position on the side of a front portion of the body;

elastically urging means for always elastically urging the slider in the card ejecting direction;

an engaging portion which is disposed in the slider and which protrudes into the card insertion space, the engagement portion being engaged with a tip end of a card which is inserted into the card insertion space and being pushed-in and moved in the card inserting direction;

a contact piece member which is held by the body and which comprises a contact which uses an external contact on a surface of the card as a counter part, the contact piece member having elasticity for always urging the contact in a direction along which the contact protrudes into the card insertion space; and a contact position regulating mechanism which is interposed between the contact piece member and the slider, which, when the slider is at the initial position, retracts the contact of the contact piece member to the outside of the card insertion space against the elasticity of the contact piece member, and which, as the slider slides from the initial position to the pushed-in position, allows the contact to protrude into the card insertion space by the elasticity of the contact piece member.

According to the thus configured connector, the engaging portion is pushed and moved by the operation of inserting a card, and the slider comprising the engaging portion is caused to slide from the initial position to the pushed-in position. When the operation of ejecting the card is done, the slider is caused to slide from the pushed-in position to the initial position by the elastically urging force of the elastically urging means. When the slider is at the initial position, the contact of the contact piece member is retracted to the outside of the card insertion space by the contact position regulating mechanism. As the slider is caused to slide from the initial position to the pushed-in position, the contact of the contact piece member protrudes into the card insertion space. After the contact protrudes into the card insertion space, the card is inserted into or ejected from the card insertion space while rubbing against the contact.

Accordingly, if a timing when the contact protrudes into the card insertion space, and when the external contact forming region of the card opposes the contact in the middle of the insertion or ejection of the card into or from the card insertion space are appropriately determined, the contact rubs against only the surface of the external contact forming region of the card.

As a result, the surface other than the external contact forming region of the card which is inserted into or ejected from the card insertion space will not be scratched. In addition, the mechanism for preventing the surface of the card from rubbing against the contact of the contact piece member is provided not in another member, but in the slider, so that it is unnecessary to use any additional component for the mechanism. Thus, the number of components can be reduced, and it is possible to provide a connector at a low production cost.

Another connector according to the present invention relates to the shape of the contact of the contact piece member and the structure of the contact position regulating mechanism. That is, in the connector according to the present invention, the contact piece member elongates from an end portion of the body in the card inserting direction along the card ejecting direction, an end portion of the contact piece member is bent and formed as an angled portion, a top portion of the angled portion is formed as a contact, and the contact position regulating mechanism comprises: a projecting piece which is cut and raised to protrude in the card ejecting direction from a slope portion positioned closer to a basal portion of the contact piece member than the top portion of the angled portion; a pressing face which is formed on the slider, and which, when the slider is at the initial position, overlaps the projecting piece to prevent the projecting piece from being displaced in a direction toward the card insertion space by the elasticity of the contact piece member; and an opening which is formed in a portion adjacent to the pressing face in the slider, and which allows the projecting piece to be displaced in the direction toward the card insertion space as the slider slides from the initial position to the pushed-in position.

According to the present invention, when the slider slides between the initial position and the pushed-in position in the card inserting direction or the card ejecting direction, the pressing face of the slider overlaps the projecting piece of the contact piece member, thereby blocking the projecting piece from being displaced in the direction toward the card insertion space. At this time, the contact does not protrude into the card insertion space, and the card is inserted into or ejected from the card insertion space while the surface of the card does not rub against the contact. As the slider slides from the initial position to the pushed-in position, the projecting piece of the contact piece member is allowed to be displaced in the direction toward the card insertion space through the opening of the slider. After the contact protrudes into the card insertion space, therefore, the card is inserted into the card insertion space or ejected from the card insertion space while rubbing against the contact. Accordingly, in the same manner as the case described above, if a timing when the contact protrudes into the card insertion space, and when the external contact forming region of the card opposes the contact in the middle of the insertion or ejection of the card to or from the card insertion space are appropriately determined, the contact rubs against only the surface of the external contact forming region of the card.

In a further connector according to the present invention, in the middle of the insertion of the card, when an external contact forming region of the card does not reach a position opposing the contact of the contact piece member, a condition in which the pressing face of the slider overlaps the projecting piece is maintained, and, when the external contact forming region of the card reaches the position opposing the contact of the contact piece member, an opening of the slider corresponds to the projecting piece.

According to the thus configured connector, in the middle of the insertion of the card, when the external contact forming region of the card does not reach the position opposing the contact of the contact piece member, the pressing face of the slider still overlaps the projecting piece. Thus, the contact rubs against only the surface of the external contact forming region of the card. After the external contact forming region of the card reaches the position opposing the contact of the contact piece member, the projecting piece moves closer to the card insertion space through the opening of the slider, so that the contact comes into contact with the external contact forming region. Also, in the connector of the present invention, when the card is ejected from the card insertion space, the contact rubs against only the surface of the external contact forming region of the card.

In a still further connector according to the present invention, the configuration for locking the slider in the pushed-in position in accordance with the insertion and ejection of the card and for canceling the lock is restricted. That is, in the connector of the present invention, the slider comprises an arm which has elasticity, in which a basal portion is cantilevered by the slider, and which is elongated in the card inserting direction, a tip end portion of the arm has a head portion which protrudes in the card insertion space when the slider is at the initial position, an upward slope face which is formed in the head portion functions as the engaging portion which is to be engaged with the tip end of the card, an engagement pawl is disposed in the head portion, and the body comprises: a guide face on which, when the slider is pushed and moved by the card from the initial position to the pushed-in position, the engagement pawl slides, thereby preventing the head portion from being pressed down by the card; an opening which is disposed adjacent to the guide face, and in which, when the slider reaches the pushed-in position, the engagement pawl of the head portion which is pressed down by the card against the elasticity of the arm falls in the opening, thereby allowing the tip end of the card to ride over the head portion; and an engaging portion which is to engage with the engagement pawl which is in the opening, in the card ejecting direction.

According to the connector, when the slider is pushed-in and moved from the initial position to the pushed-in position by the card, the engagement pawl of the head portion which is disposed in the slider via the arm is engaged with the engagement portion of the body, and the slider is locked in that position. Even if the slider is elastically urged in the card ejecting direction, therefore, the slider will not return to the initial position due to the elastic urging force. Thus, the card is kept to be inserted into the card insertion space. When, in a condition where the slider is locked as described above, the card which is inserted into the card insertion space is pulled and moved in the card ejecting direction, the tip end of the card is retracted from the space above the head portion. At this timing, the head portion is restored to the original position due to the elasticity of the arm. As a result, the engagement pawl is released from the engaging portion and the lock is canceled. The slider is then returned to the initial position by the force which elastically urges the slider in the card ejecting direction.

Preferably, the slider, the arm, the head portion, and the engagement pawl are formed as an integrally molded body made of a synthetic resin. By adopting this configuration, the arm is provided with elasticity peculiar to the synthetic resin. The mechanism for locking the slider in the pushed position and the mechanism for canceling the lock are disposed so as to be separated in both the slider and the body, and any other extra component is not used for constituting the mechanisms. Thus, the number of components can be reduced as compared with the prior art connector, and hence the connector can be configured in a simplified manner. Accordingly, the connector can be provided at a low cost as compared with the prior art connector.

A still further connector according to the present invention relates to a configuration for holding a card which is inserted into the card insertion space in position. That is, in the connector of the present invention, the card insertion space is a space between a flat-plate partition wall which is disposed in the body and which forms a slider housing space on the side of a back face, and a face of a cover which is mounted on the body, the cover face opposing the partition wall, and, when the engagement pawl is engaged with the engaging portion, the card is pressingly held in an elastic manner by the head portion which is elastically in contact with the card due to the elastic restoring force of the arm, and the cover.

According to this connector, the card which is inserted into the card insertion space is pressingly held in position by the head portion and the cover by a force corresponding to the elastic restoring force of the arm. In addition, the partition wall functions as a component for reinforcing the body, so that the strength of the body is increased.

In a still further connector according to the present invention, the card insertion space is a space between a flat-plate partition wall which is disposed in the body and which forms a slider housing space on the side of a back face, and a face of a cover which is mounted on the body, the cover face opposing the partition wall, and an opening through which the angled portion of the contact piece member can pass is formed in the partition wall.

In a still further connector according to the present invention, the card insertion space is a space between a flat-plate partition wall which is disposed in the body and which forms a slider housing space on the side of a back face, and a face of a cover which is mounted on the body, the cover face opposing the partition wall, and an opening into which the head portion is loosely fitted is formed in the partition wall.

In these embodiments, the partition wall is useful for reinforcing the body. According to these embodiments, therefore, the measure for preventing the surface of the card from being damaged by scratches and the measure for holding the card which is inserted into the body in position are taken in the connector having the body which is reinforced by the partition wall.

A still further connector according to the present invention is a multipolar connector comprising a number of contact piece members.

According to the present invention, the connector can be used for a card in which a number of external contacts are formed in the external contact forming region.

DETAILED DESCRIPTION OF THE PREFERRED EMBODIMENTS

A connector comprises the body 1, a slider 4, and a cover 7.

Figure 1:
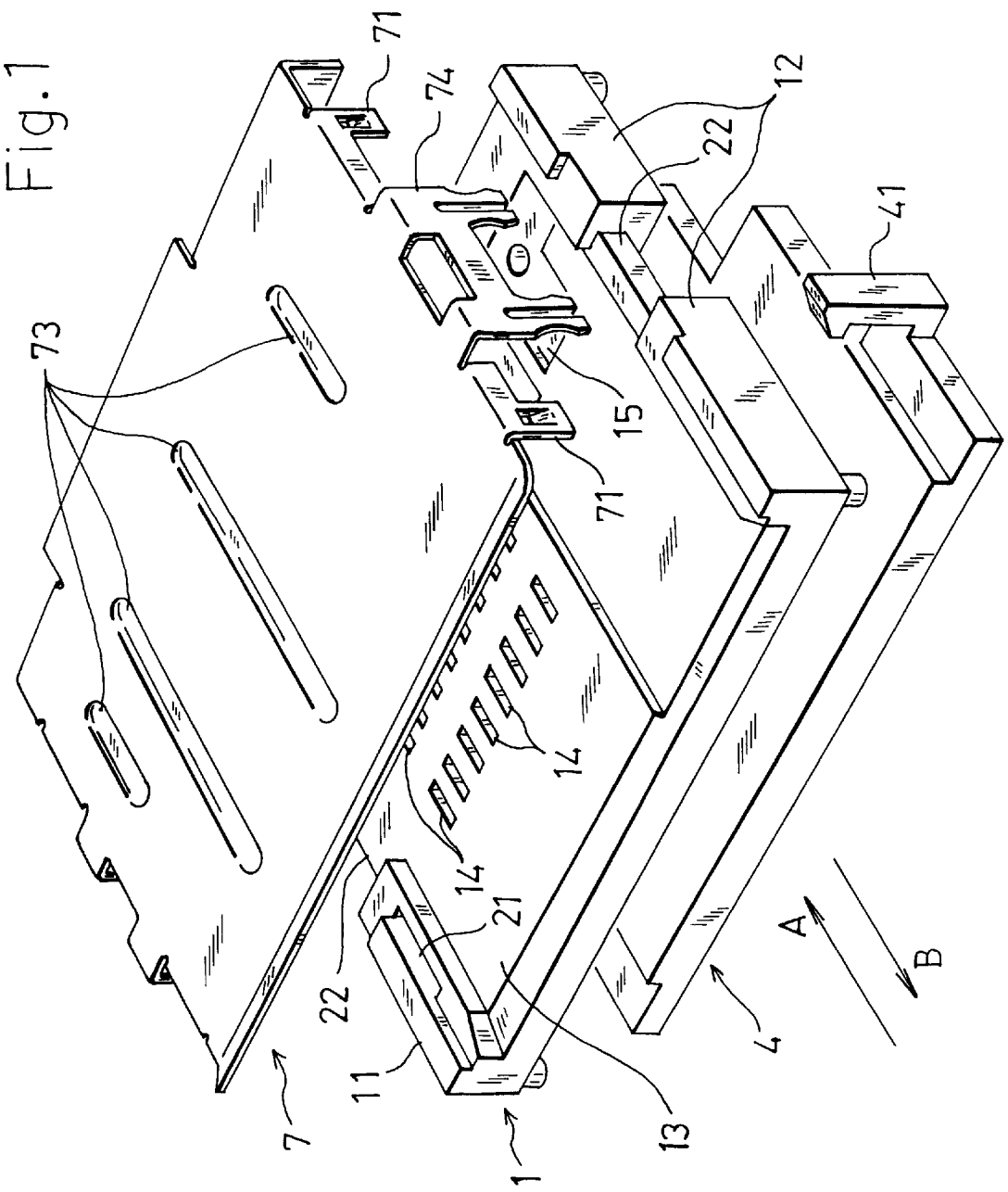
FIG. 1 is an exploded perspective view schematically showing a connector which is an embodiment of the present invention.
Figure 2:
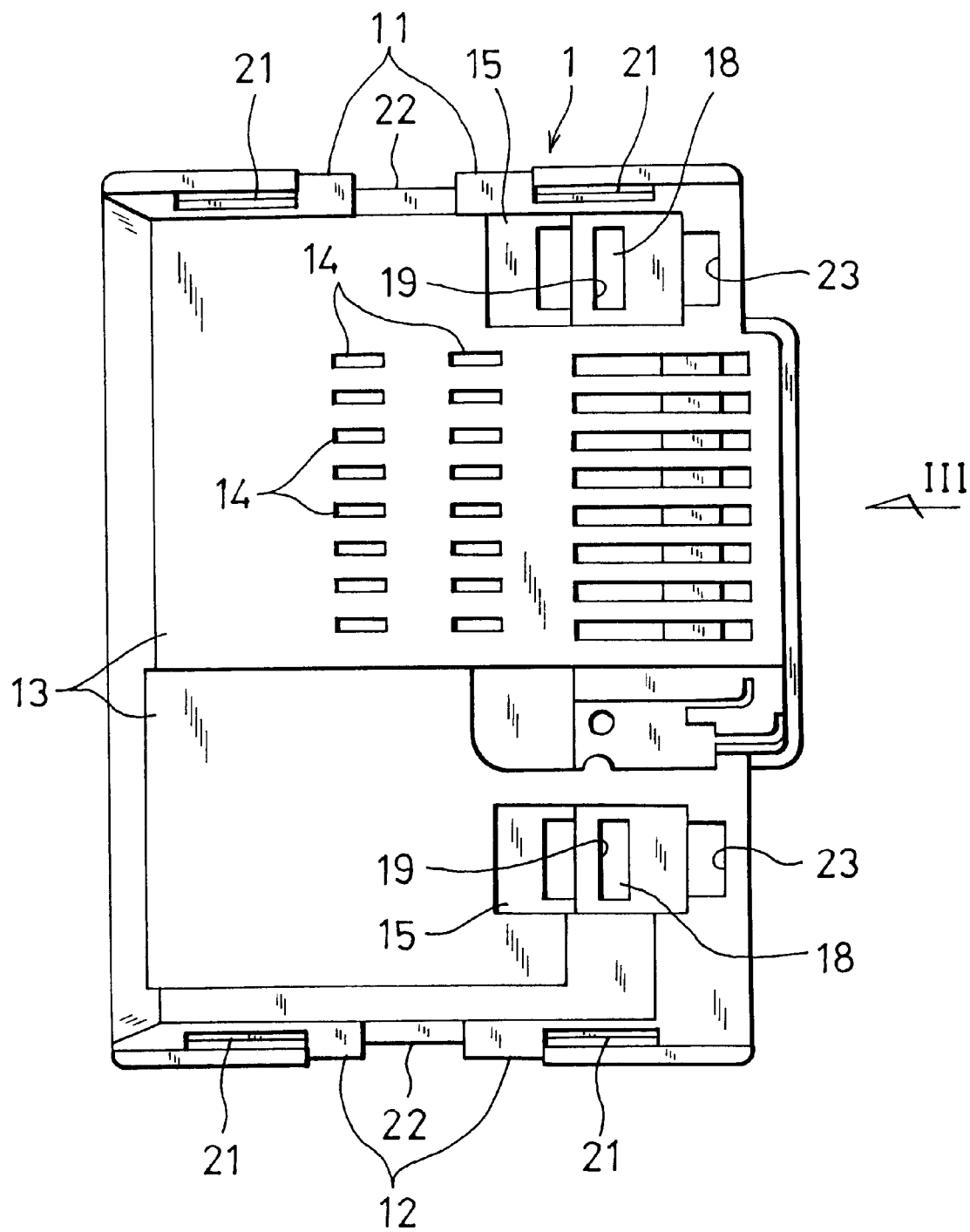
FIG. 2 is a plan view of the body of FIG. 1.
Figure 3:
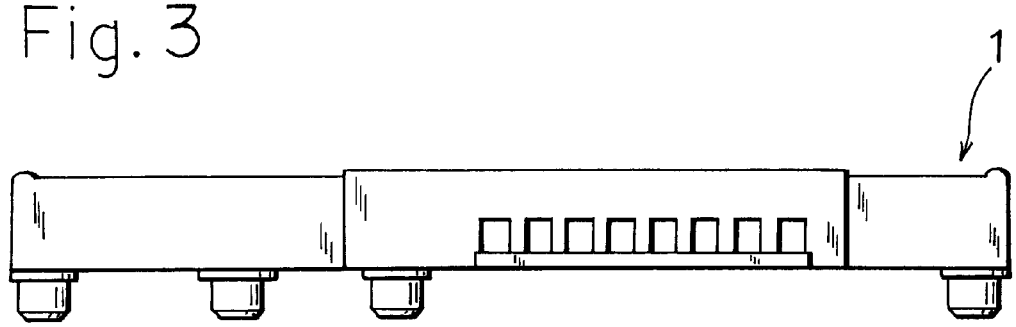
FIG. 3 is a view seen in a direction indicated by an arrow III of FIG. 2.
Figure 9:
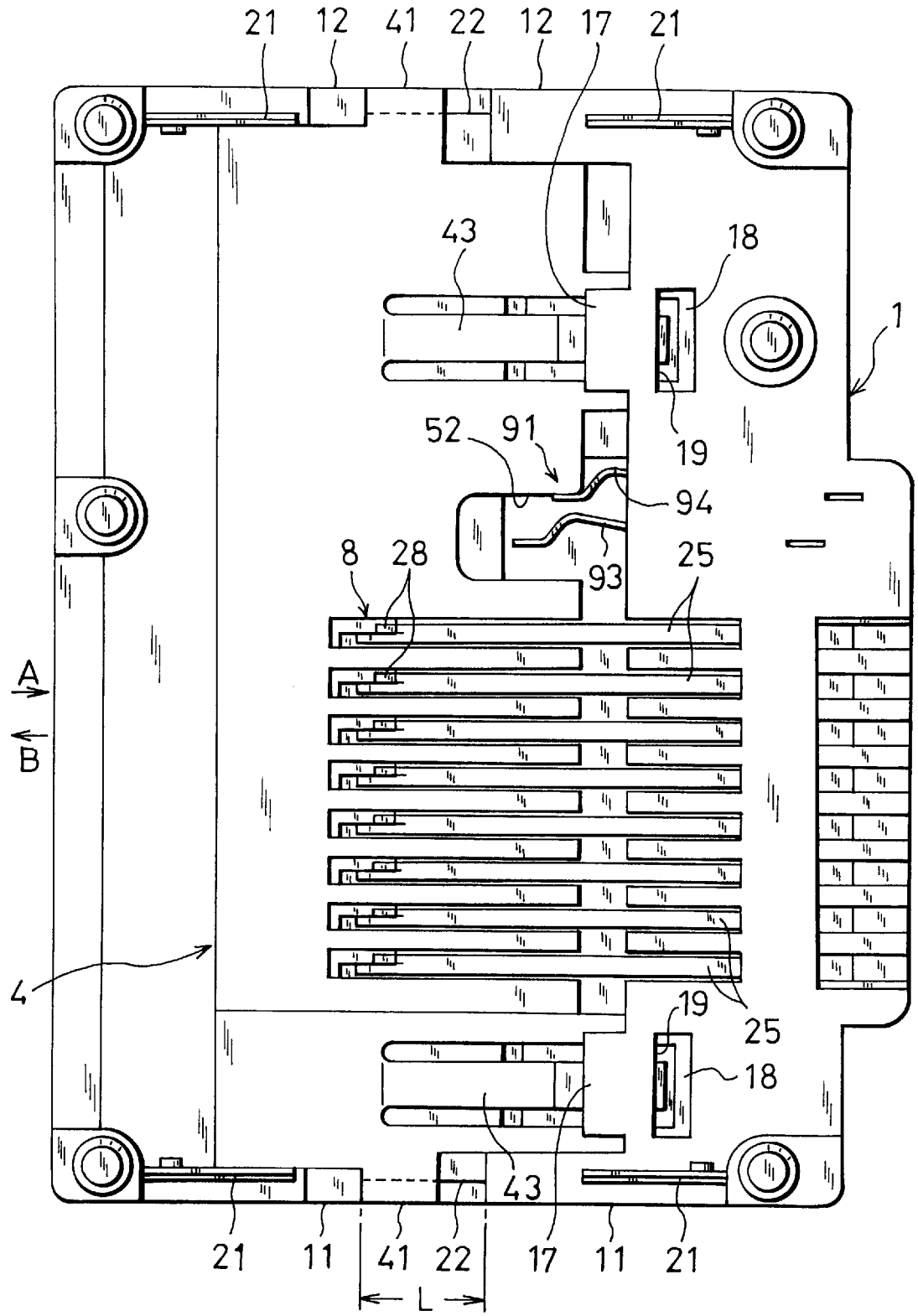
FIG. 9 is a plan view seen from the side of a back face of the connector.
Figure 12:
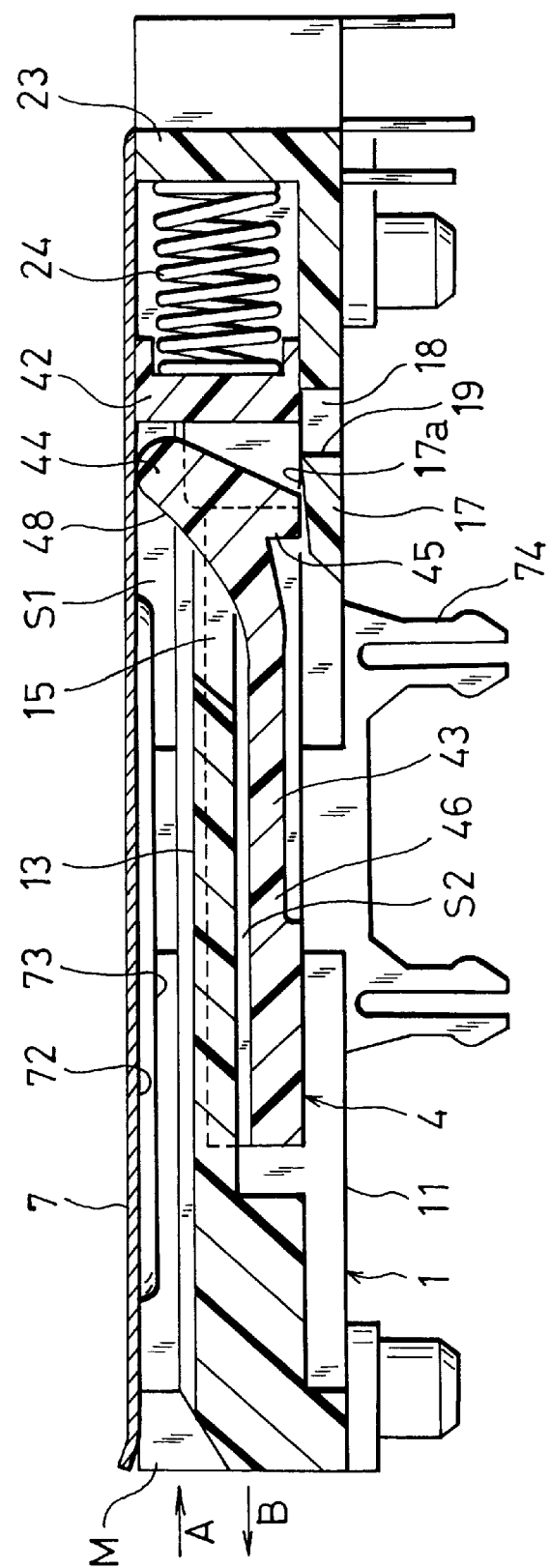
FIG. 12 is a section view showing an arm, a head portion, and the like in a condition in which a card is not inserted.
Figure 16:
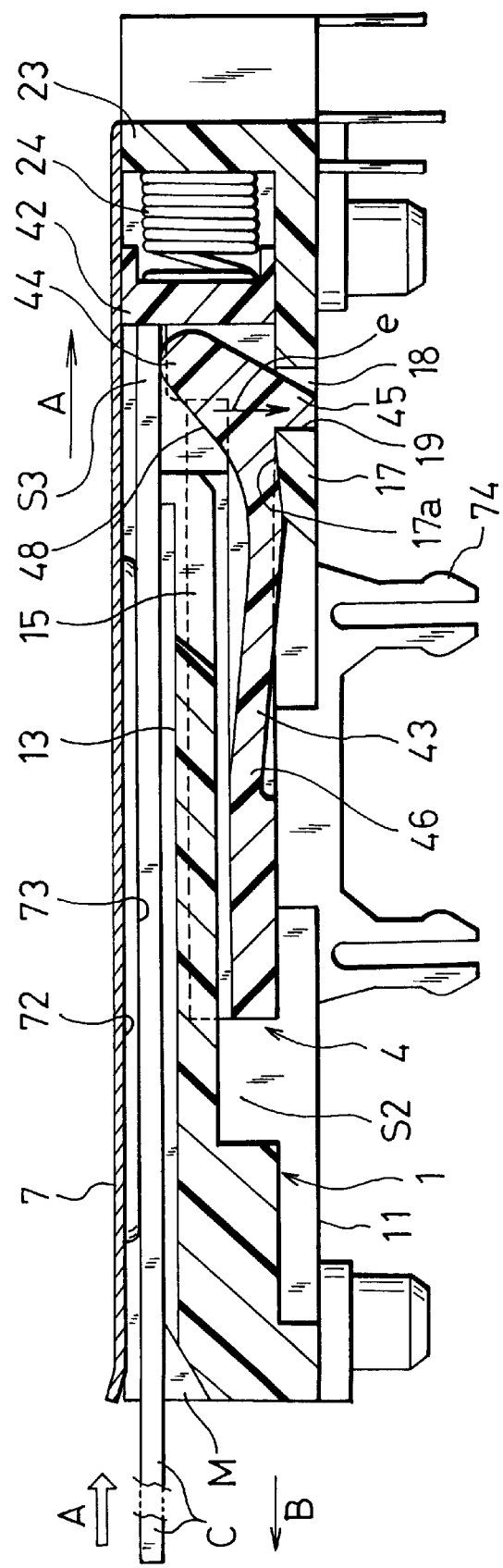
FIG. 16 is a section view showing the arm, the head portion, and the like in a condition in which a card is inserted.

As shown in FIG. 1, the body 1 integrally comprises a partition wall 13 positioned between right and left frames 11 and 12 in each of which a middle portion is opened. A card insertion space S1 which will be described later can be formed on the top surface side of the partition wall 13, and a slider housing space S2 which will be described later can be formed on the back side or lower surface of the wall 13. Referring to FIG. 2, in the partition wall 13, a number of small openings 14 are formed so as to be arranged as two lines designated as a front and rear line. Angled portions a of contact piece members 25 which will be described later can enter and leave the small openings 14. Openings 15 are formed in areas between which the lines of the small openings, respectively are interposed. As shown in FIGS. 9, 12, and 16, in the body 1, a lower wall 17 protrudes from an end portion in a card inserting direction A (on the side of a tip end portion) in a card ejecting direction B (toward the side of a rear end portion). Openings 18 are formed in the lower wall 17, and engagement portions 19 are configured by the rear wall faces of the openings 18, respectively. The body 1 consists of an integrally molded body of a synthetic resin with a superior electrical insulation property.

Figure 13:
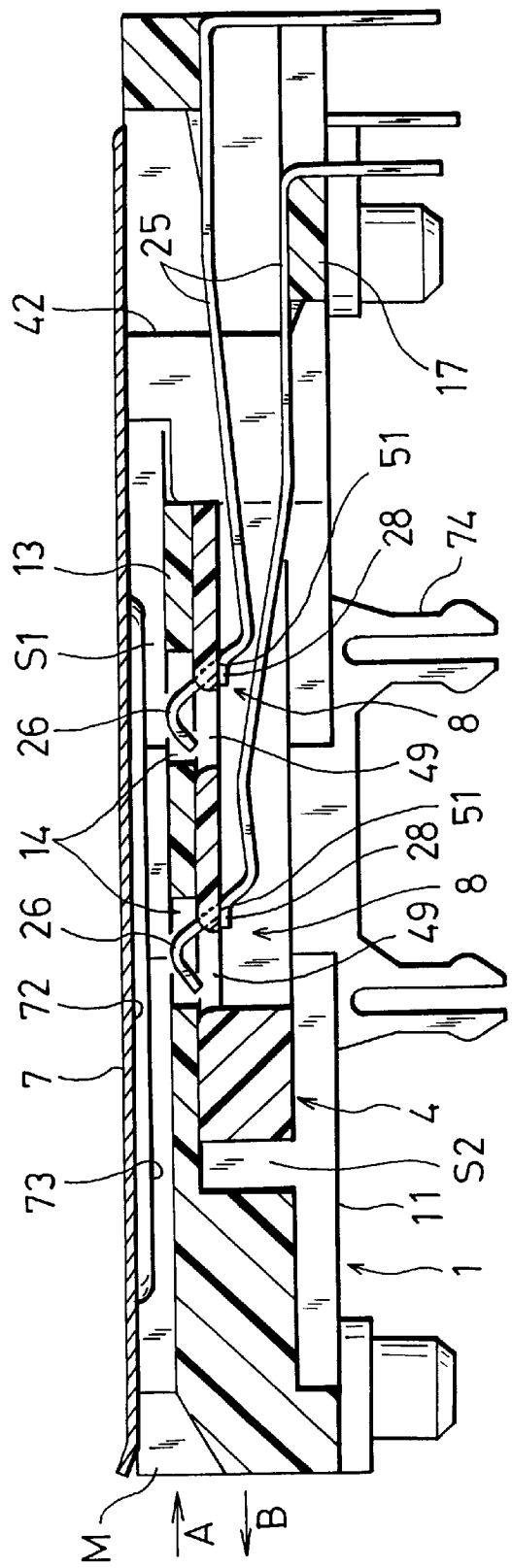
FIG. 13 is a section view showing the contact position regulating mechanism in a condition in which a card is not inserted.
Figure 14:
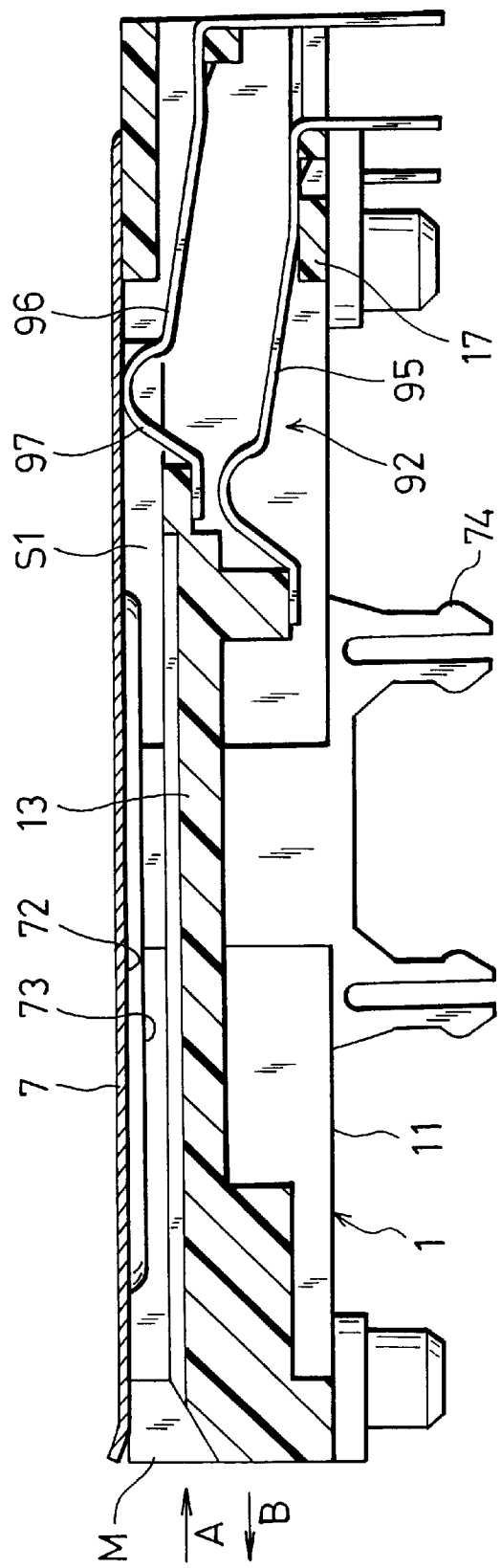
FIG. 14 is a view showing a switch mechanism in a condition in which a card is not inserted.

The cover 7 is made of a metal and attached to the body 1 by inserting a plurality of engagement legs 71 disposed on right and left end portions into inserting slits 21 (see FIGS. 1, 4, and 9) disposed in predetermined portions of the body 1. When the cover 7 is attached to the body 1, as shown in FIGS. 12 to 14, the card insertion space S1 is formed by the partition wall 13 having a flat plate shape and on the side of the body 1, and a face 72 of the cover 7 and opposing the partition wall 13. In addition, a card insertion port M is opened in the rear end of the body 1. In the connector of the embodiment, four ridges 73 are formed in the cover 7. A card C can be inserted without rattling into a gap between the ridges 73 and the partition wall 13 (see FIGS. 16 to 18). The cover 7 functions also as a shield frame. For this reason, the cover 7 comprises a grounding terminal 74.

Figure 4:
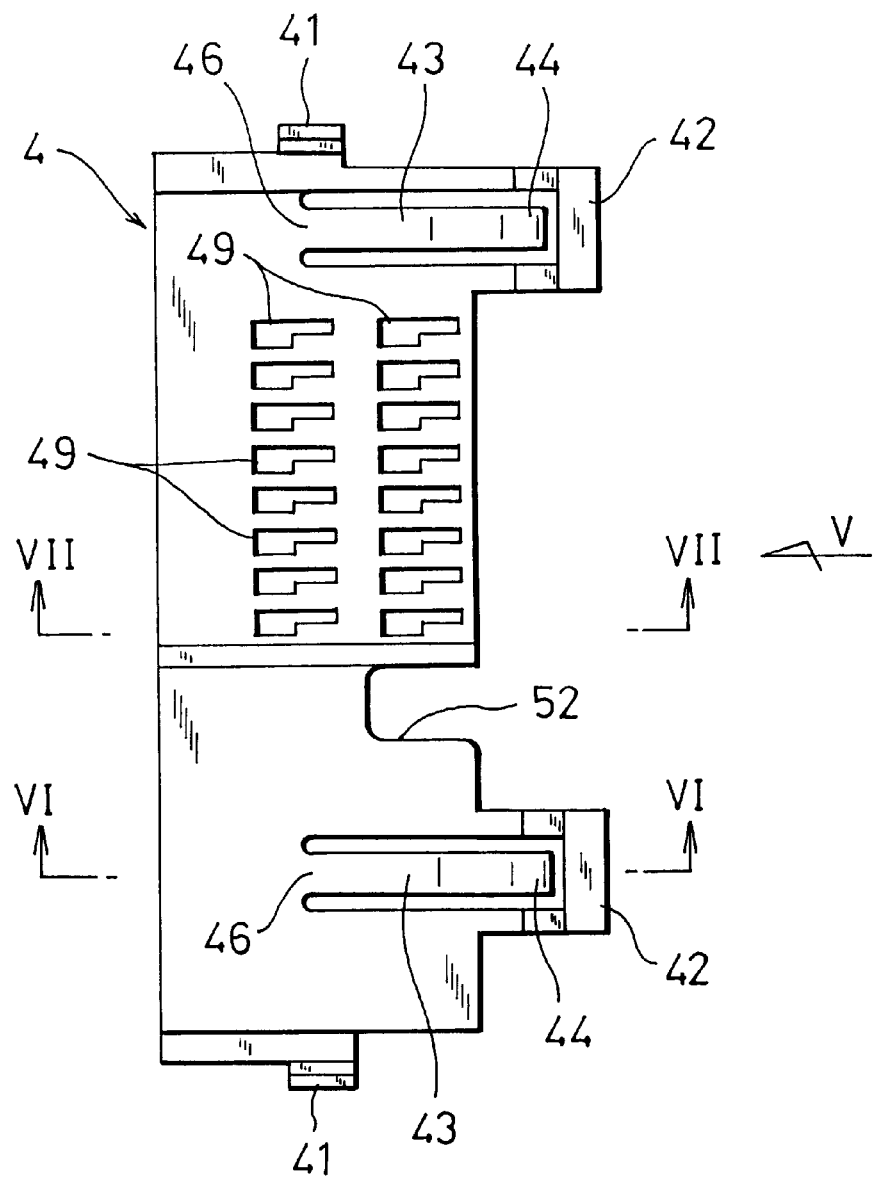
FIG. 4 is a plan view of a slider.
Figure 5:
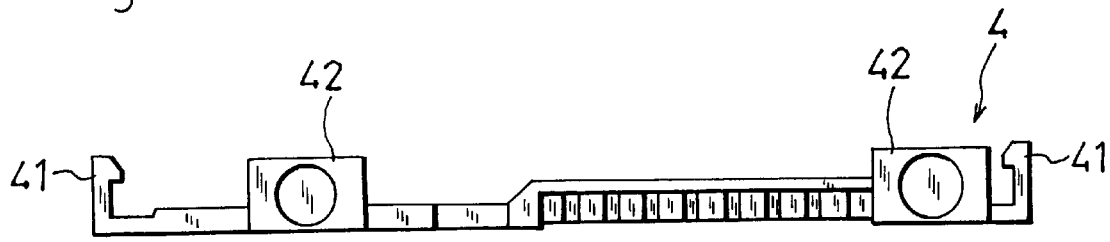
FIG. 5 is a view seen in a direction indicated by an arrow V of FIG. 4.
Figure 8:
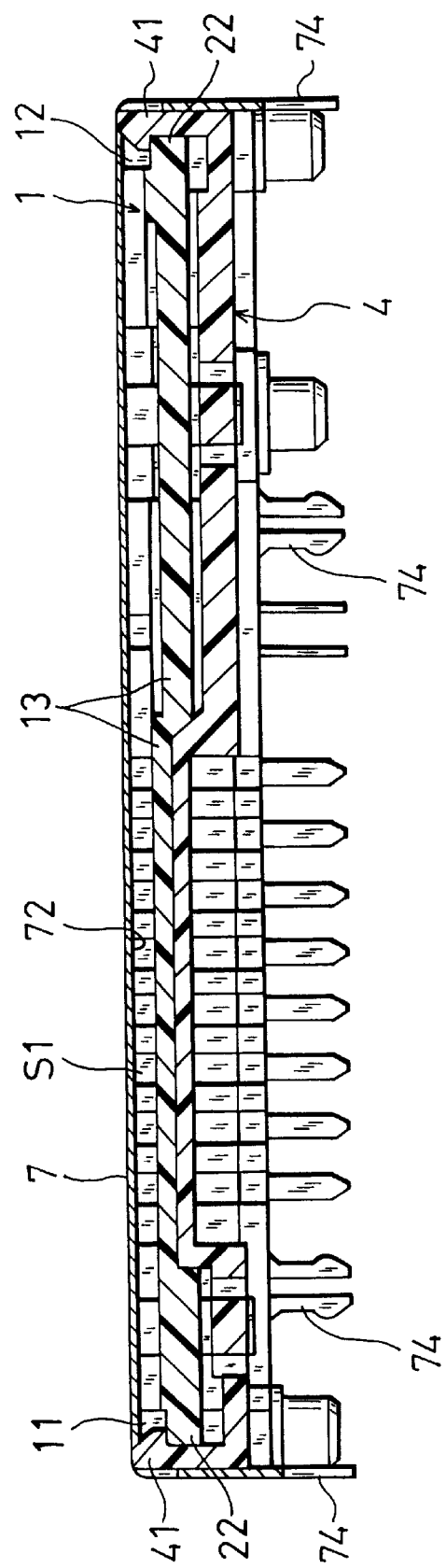
FIG. 8 is a longitudinal sectional front view of the connector.

As shown in FIGS. 1, 4, and 5, engaging pawls 41 are raised from the right and left end portions of the slider 4. As shown in FIG. 8, the engaging pawls 41 are engaged with guide portions 22 formed in the right and left end portions of the partition wall 13 of the body 1 shown in FIG. 2. As a result, the slider 4 is held by the body 1 and housed in the slider housing space S2 on the back face side of the partition wall 13 (see FIGS. 12, 13, 16, and 17). The engaging pawls 41 which are engaged with the guide portions 22 as described above can slide in the forward and backward directions up to a position where the engaging pawls 41 abut against the frames 11 or 12, and in which the middle portion is opened in the front and back positions of the guide portions 22. In FIG. 9, the width of the gaps which are formed in the middle portions of the frames 11 and 12 on the front and back sides are designated by a letter L. When the engaging pawls 41 are moved backward and abut against the frames 11 and 12 as shown in FIGS. 8 and 9, the position of the slider 4 is regarded as an initial position.

The slider 4 is provided with a pair of right and left spring brackets 42. As shown in FIGS. 12 and 16, coil springs 24 are interposed between the spring brackets 42 and corresponding spring brackets 23 disposed on the body 1, respectively. The slider 4 is always urged in the cover ejecting direction (i.e., toward the initial position, the left in FIG. 12) by means of the springs 24.

Figure 6:
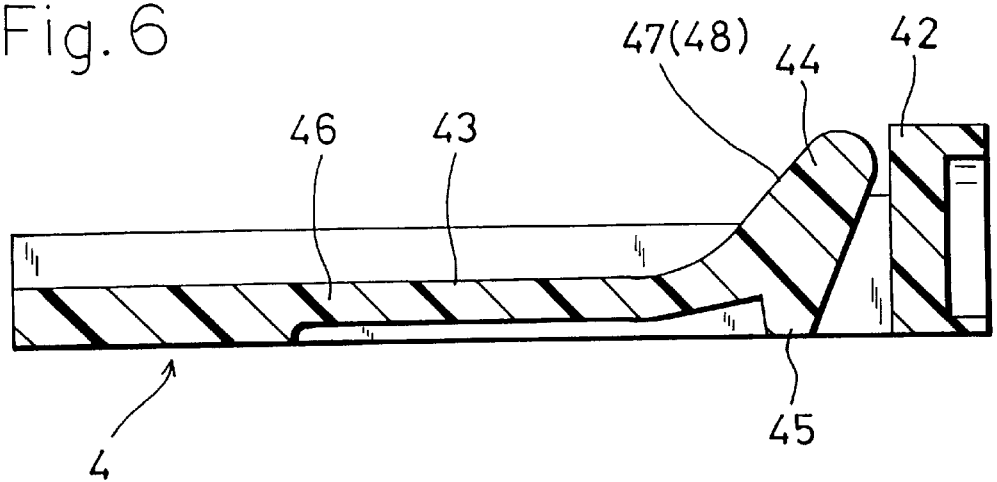
FIG. 6 is an enlarged section view taken along line VI—VI of FIG. 4.
Figure 7:
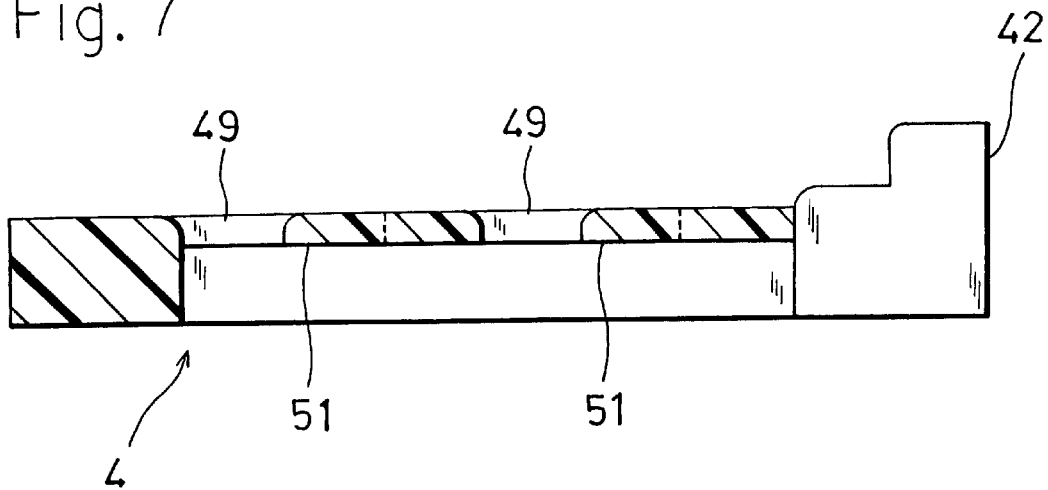
FIG. 7 is an enlarged section view taken along line VII—VII of FIG. 4.

The slider 4 is made of a synthetic resin. Arms 43 are disposed in two portions, i.e., right and left portions of the slider 4. As shown in FIG. 6, each of the arms 43 comprises a head portion 44 in its tip end portion, and an engagement pawl 45 is formed in the head portion 44. Specifically, each arm 43 has a shape in which the basal portion 46 is cantilevered by the slider 4 as a result of removing away a predetermined portion of the slider 4 so as to produce a U-like shape, and elongates in the card inserting direction. The head portion 44 is integrally formed in a shape elongating in an obliquely upward direction from the end portion of the arm, 43. The engagement pawl 45 is formed at the lower end of the head portion 44. The head portion 44 comprises an upward sloping face 47. The sloping face 47 functions as an engaging portion 48 which will engage with the tip end of the cover C. The slider 4, the arms 43, the head portions 44, and the engagement pawls 45 are formed as an integrally molded body made of a synthetic resin. Accordingly, the elasticity of the arms 43 is peculiar to that synthetic resin.

As shown in FIG. 12, when the slider 4 is at the initial position, the head portions 44 are caused to loosely pass through the openings 15 of the partition wall 13 by the elasticity of the arms 43, so that the head portions 44 protrude into the card insertion space S1. At this time, the head portions 44 and the engagement pawls 45 are interposed between the cover 7 and the lower wall 17 of the body 1 in a forwardly and backwardly slidable manner. When the engaging portions 48 of the head portions 44 are pushed by the tip end of the card C and the slider 4 is pushed and moved (slid) in the card inserting direction A against the urging force of the springs 24, the engagement pawls 45 are caused to slide on a guide face 17a which is the upper face of the lower wall 17, as shown in FIG. 16. When the engagement pawls 45 reach the openings 18, the head portions 44 are pushed down, as indicated by an arrow e, by means of the tip end of the card C. Thus, the engagement pawls 45 fall in the respective openings 18. When the engagement pawls 45 fall in the openings 18, the card insertion space S1 which is normally blocked by the head portions 44 is now opened and a gap S3 is formed between the head portions 44 and the cover 7. The tip end of the card C can ride over the head portions 44 and enter the gap S3. Since the slider 4 is urged by the springs 24 in the card ejecting direction B, the engagement pawls 45 which fall in the openings 18 are engaged with the respective engagement portions 19 in the card ejecting portion B. The position where the slider 4 is located when the engagement pawl 45 is engaged with the engagement portion 19 is the pushed-in position. The tip end of the card C which has passed over the head portions 44 abuts against the above-mentioned spring brackets 42 and is thus positioned. At this time, due to the elastic restoring force of the arms 43, the card C is elastically pressingly held by the cover 7 and the head portions 44 which are elastically in contact with the card C.

Figure 22:
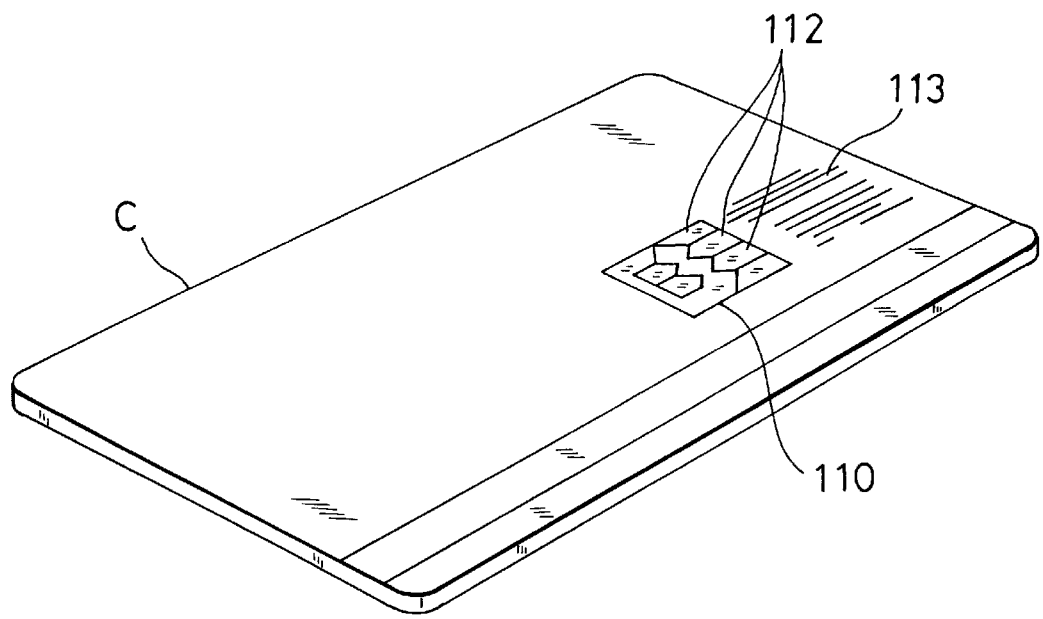
FIG. 22 is a perspective view of a card.

As shown in FIG. 4, two lines, i.e., front and rear lines of openings 49 are formed in the slider 4. A portion on the rear side of each opening 49 is wider than a portion on the front side thereof. On the other hand, as shown in FIG. 13, a number of contact piece members 25 are attached to the body 1 from the tip end side. The contact piece members 25 comprise contacts 26 which use external contacts 112 of the card C shown in FIG. 22 as the counter parts, respectively. The contact piece members 25 have elasticity for always urging the contacts 26 in a direction along which the contacts protrude into the card insertion space S1. As shown in FIGS. 10, 11, 13, and 17, the contact piece members 25 elongate from the end portion on the side of the card inserting direction A of the body 1 along the card ejecting direction B. The tip end portion of each contact piece member 25 is bent so as to be formed as an angled portion. The tops of the bent portions a of the contact piece members 25 correspond to the contacts 26, respectively. Through the small openings 14 formed in the partition wall 13, the angled portions a of the contact piece members 25 can enter and be retracted. As shown in detail in FIGS. 10 and 11, a projecting piece 28 is formed so as to protrude in the card ejecting direction B from a slope portion 27 which is positioned closer to the basal portion of each contact piece member 25 than the top of the angled portion a. A contact position regulating mechanism 8 is formed by each opening 49, a pressing face 51 positioned adjacent to the opening 49 on the side of the card inserting direction A, and the projecting piece 28 of each contact piece member 25.

Figure 10:
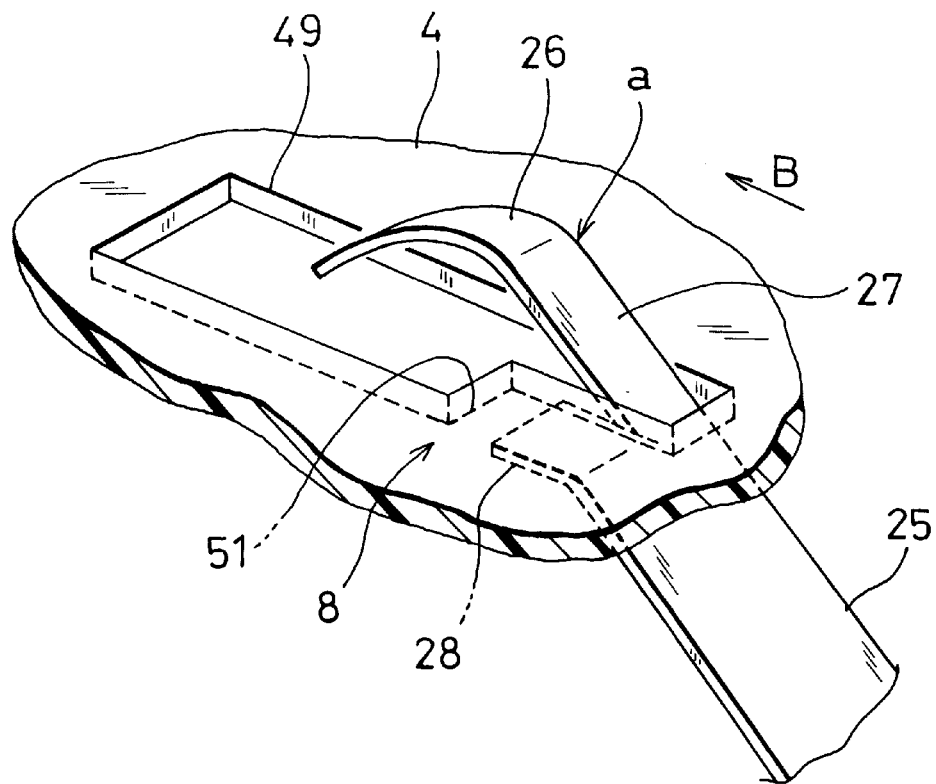
FIG. 10 is a perspective view illustrating a contact position regulating mechanism.
Figure 11:
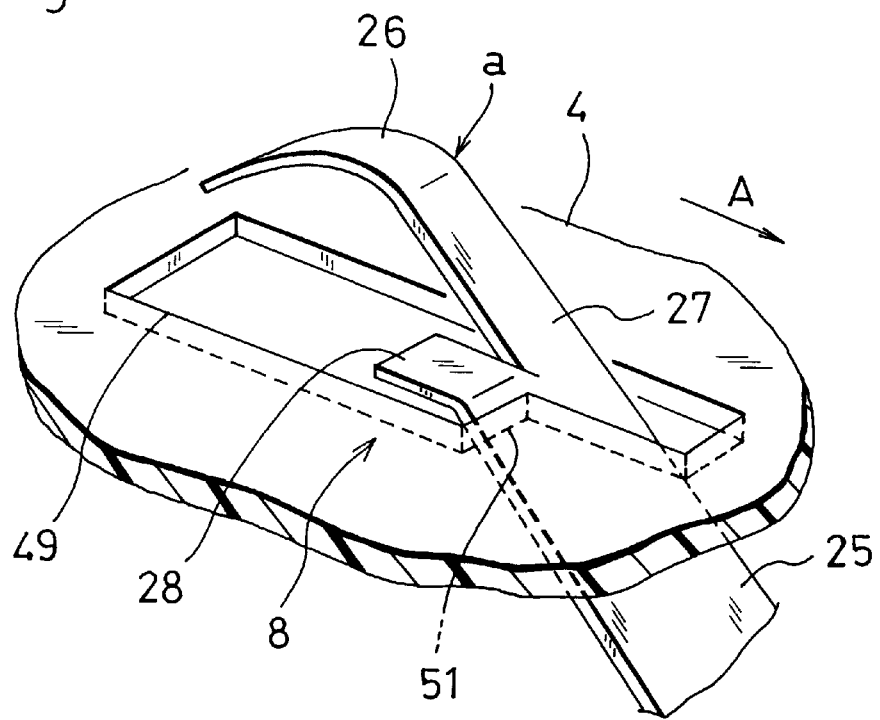
FIG. 11 is a perspective view illustrating the contact position regulating mechanism.
Figure 17:
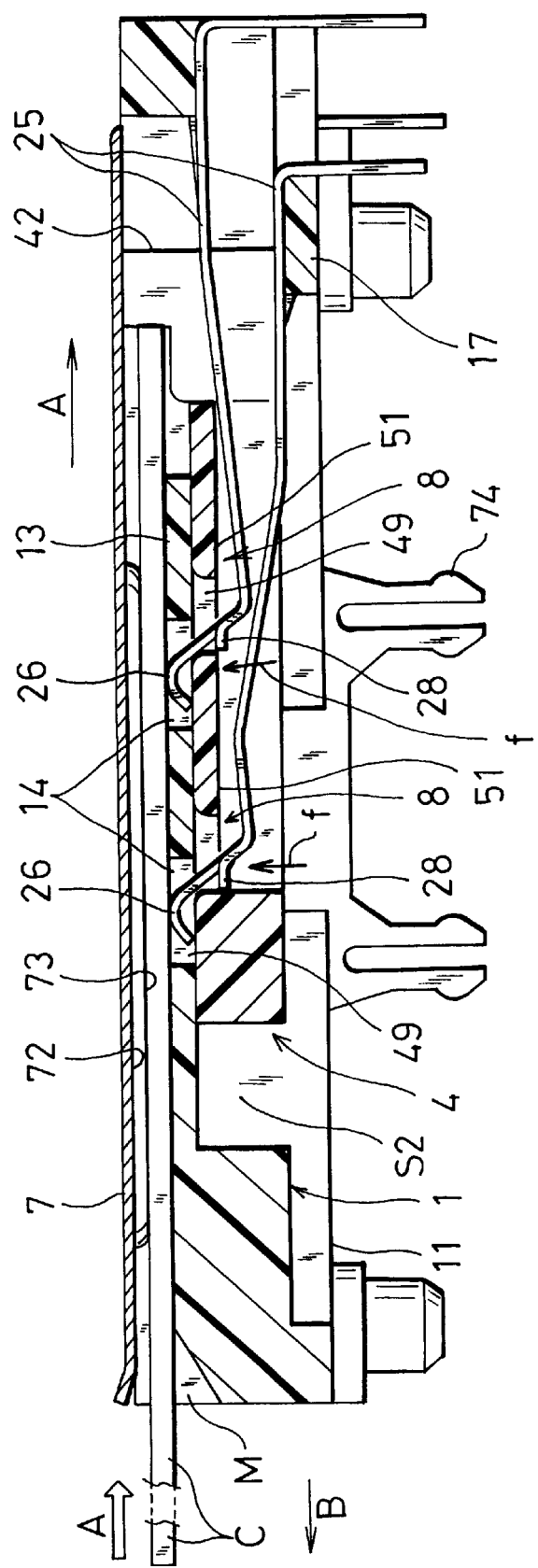
FIG. 17 is a section view showing the contact position regulating mechanism in a condition in which a card is inserted.

In this way, the contact position regulating mechanism 8 is formed so as to be separated in both the contact piece member 25 and the slider 4. As for the contact position regulating mechanism 8, when the slider 4 is in the initial position, as shown in FIGS. 10 and 13, the pressing face 51 overlaps the projecting piece 28 and the projecting piece 28 is prevented from being displaced toward the card insertion space S1 due to the elasticity of the contact piece member 25. As indicated by an arrow A in FIG. 11, when the slider 4 slides from the initial position to the pushed-in position, the projecting pieces 28 are accordingly caused to reach the respective openings 49. When the whole of the projecting piece 28 reaches the corresponding opening 49 as shown in FIGS. 11 and 17, the projecting piece 28 can be displaced toward the card insertion space S1 through the opening 49 due to the elasticity of the contact piece member 25.

In the connector of the embodiment, the timing as to when the projecting pieces 28 can be displaced toward the card insertion space S1 through the openings 49 is determined as follows. In the middle of the insertion of a card, when the external contact forming region 110 of the card C illustrated in FIG. 22 has not yet reached a position opposing the contacts 26 of the contact piece members 25, the condition in which the pressing faces 51 of the slider 4 overlap the respective projecting pieces 28 is maintained. When the external contact forming region 110 of the card C reaches the position opposing the contacts 26 of the contact piece members 25, each of the openings 49 of the slider 4 reaches and corresponds to the whole of the corresponding projecting piece 28.

Figure 20:
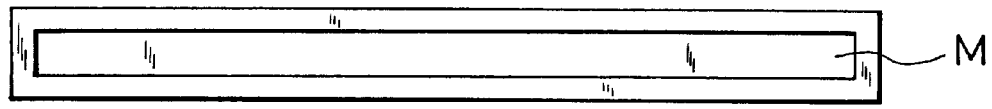
FIG. 20 is a front view schematically showing the connector according to the present invention.
Figure 21:
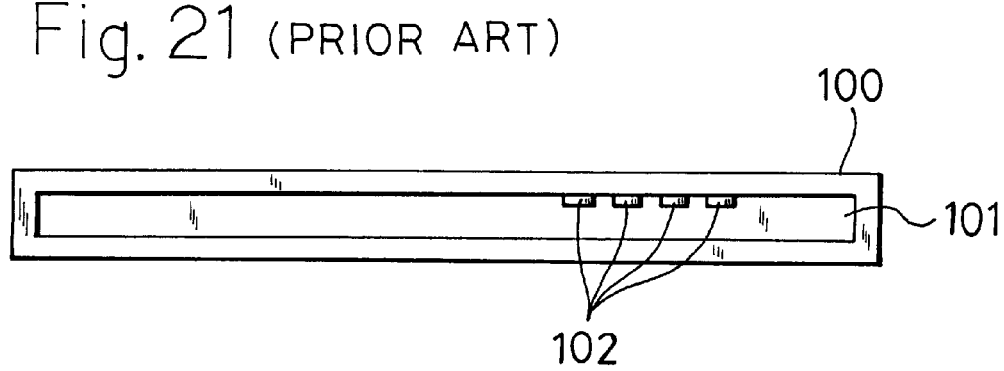
FIG. 21 is a front view schematically showing a prior art connector.

The connector of the embodiment is a multipolar connector comprising a number of contact piece members 25. The contact position regulating mechanism 8 is disposed for each of the contact piece members 25. Accordingly, as shown in FIG. 20, in a condition in which no card is inserted, the contacts 26 cannot be seen from the outside through the card insertion port M.

Figure 15:
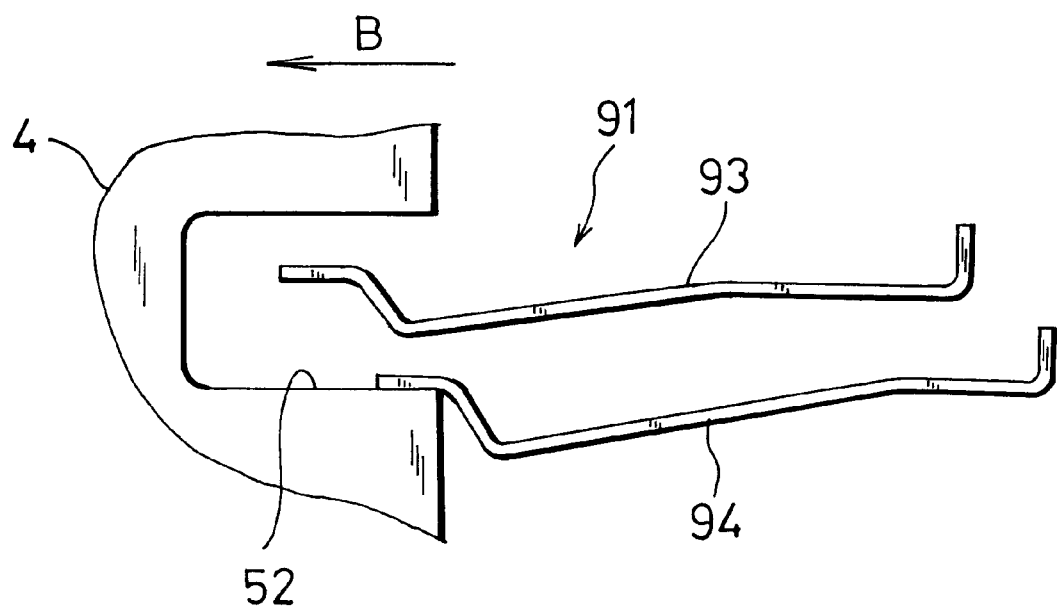
FIG. 15 is a view showing another switch mechanism in a condition in which a card is not inserted.
Figure 18:
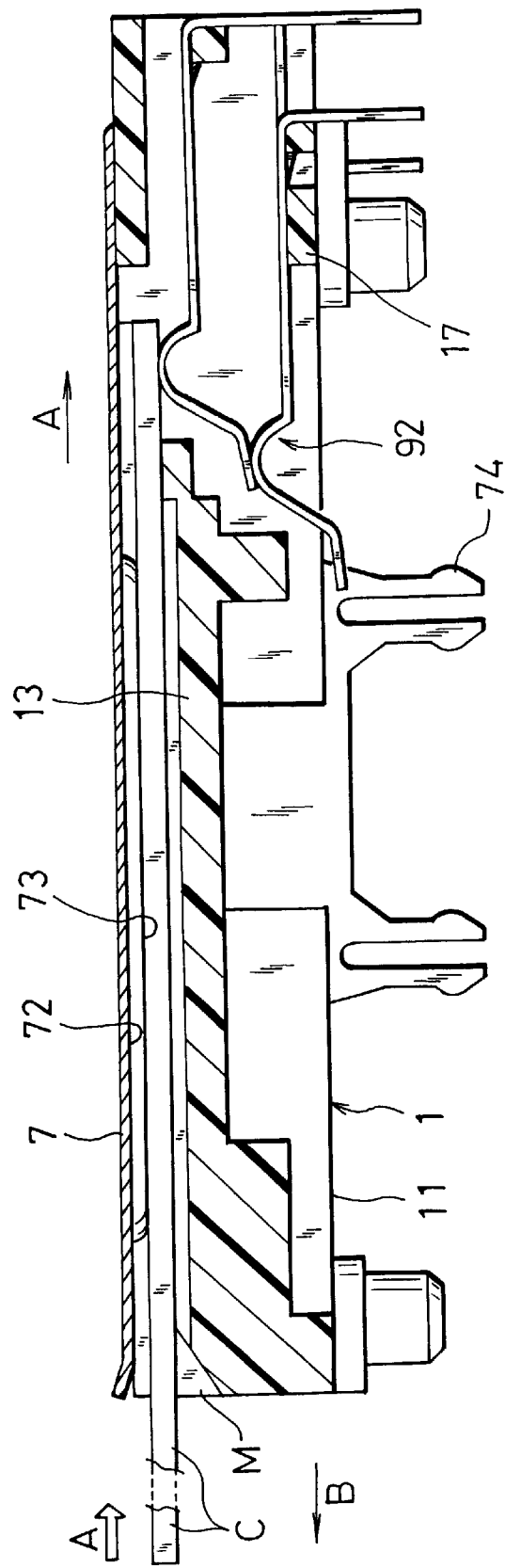
FIG. 18 is a view showing the switch mechanism in a condition in which a card is inserted.
Figure 19:
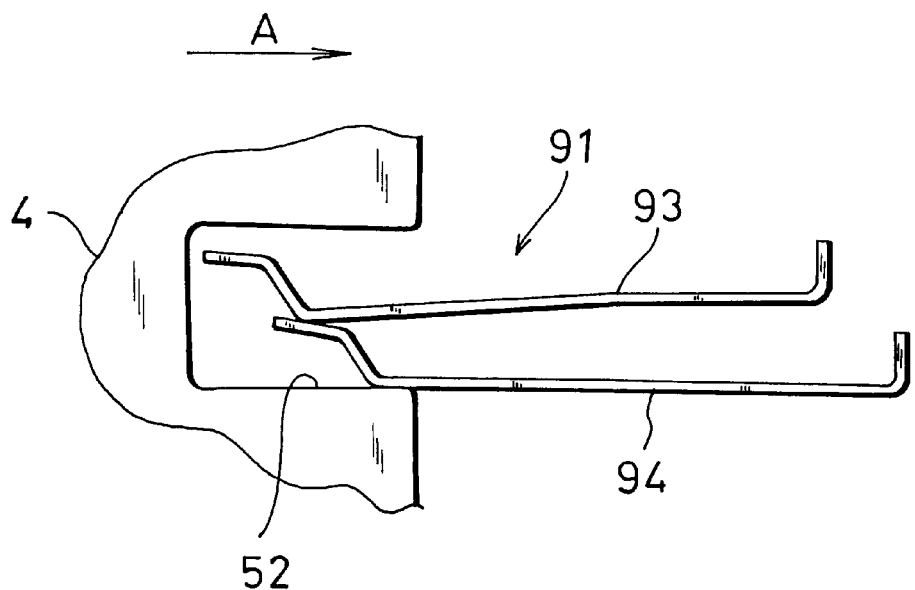
FIG. 19 is a view showing the other switch mechanism in a condition in which a card is inserted.

The connector is provided with two types of switch mechanisms 91 and 92 for detecting whether a card is inserted or not. The one switch mechanism 91 is shown in FIGS. 9, 15, and 19. The switch mechanism 91 comprises a pair of normally-open contact piece members 93 and 94 which are attached to the body 1, and a recessed operating portion 52 formed in the slider 4. The other switch mechanism 92 is shown in FIGS. 14 and 18. The switch mechanism 92 comprises a pair of normally-open contact piece members 95 and 96 which are attached to the body 1. An angled portion 97 which is bent and formed in the one contact piece member 96 protrudes into the card insertion space S1. The switch mechanisms 91 and 92 are disposed in areas in which the arms 43 and the contact position regulating mechanisms 8 are not disposed.

Next, the several stages will be described with reference to FIGS. 12 to 19.

When the slider 4 is pushed by the springs 24 so as to be at the initial position, the head portions 44 protrude into the card insertion space S1 as shown in FIG. 12. The pressing faces 51 overlap the respective projecting pieces 28 as shown in FIG. 13, and the contacts 26 of the contact piece members 25 are retracted from the card insertion space S1. The angled portion 97 of the one contact piece member 96 of the switch mechanism 92 protrudes into the card insertion space S1 as shown in FIG. 14. The contact piece member 94 of the switch mechanism 91 is engaged with the operating portion 52 of the slider 4 as shown in FIG. 15.

When the card C is inserted into the card insertion space S1 through the card insertion port M as shown in FIGS. 16 to 18, the pressing faces 51 remain to overlap the projecting pieces 28 until the tip end of the card C abuts against the engaging portions 48 of the head portions 44 as shown in FIG. 13. Therefore, the contacts 26 of the contact piece members 25 are retracted from the card insertion space S1, and the contacts 26 do not rub against the surface of the card C.

After the tip end of the card C abuts against the engaging portions 48, the tip end of the card C presses the engaging portions 48. As the card C is further inserted, the slider 4 is caused to slide toward the pushed-in position. At this time, the engagement pawls 45 are also caused to slide while being supported by the guide face 17a of the lower wall 17, so that the heads 44 are not pressed down by the card C. After the external contact forming region 110 (see FIG. 22) of the card C reaches the position opposing the contacts 26 of the contact piece members 25, the projecting pieces 28 are moved toward the card insertion space S1 through the openings 14 of the slider 4 as indicated by arrows f in FIG. 17. Thus, the contacts 26 come into contact with the external contact forming region 110 (see FIG. 22).

When the slider 4 is pushed and moved from the initial position to the pushed-in position by the card C, the tip end of the card C rides over the head portions 44 as shown in FIG. 16. Thus, the head portions 44 are pressed down as indicated by the arrow e, and the engagement pawls 45 of the head portions 44 fall in the respective openings 18 of the body 1, so as to be engaged with the engagement portions 19. That is, a locked condition is realized. At this time, the card C is elastically pressingly held by the head portions 44 which are elastically in contact with the card C due to the elastic restoring force of the arms 43, and the cover 7, so that the card C cannot be easily pulled out.

When the slider 4 is pushed up to the pushed-in position, the one contact piece member 94 of the switch mechanism 91 is pressed by the operating portion 52 as shown in FIG. 19, so as to elastically come into contact with the other contact piece member 93. In addition, the angled portion 97 of one contact piece member 96 of the switch mechanism 92 is pressed by the card C as shown in FIG. 18, so as to elastically come into contact with the other contact piece member 92. The switch mechanisms 91 and 92 are closed in this way, with the result that it is judged that the card C is inserted into the card insertion space S1.

In the case where the slider 4 is locked as described above and the card C which is inserted into the card insertion space S1 is then pulled and forcedly moved in the card ejecting direction B will be considered. In this case, when the tip end of the card C is retracted from the space above the head portions 44, the head portions 44 are restored to the original position due to the elasticity of the arms 43. Thus, the engagement pawls 45 are disengaged from the engagement portions 19, and the lock is canceled. Accordingly, the slider 4 is returned to the initial position by the force of the spring members 24. When the external contact region 110 of the card C is pushed back to a position where it does not face the contacts 26 by the slider 4, the pressing faces 51 are caused to overlap the projecting pieces 28 by means of the contact position regulating mechanisms 8. Accordingly, the projecting pieces 28 are moved away from the card insertion space S1, and the contacts 26 are retracted to the outside of the card insertion space S1. Also when the card C is ejected, the contacts 26 will not rub against the card surface. In this case, the pressing faces 51 overlap the projecting pieces 28 while sliding along the slope portions 27 of the contact piece members 25, so that there is no possibility that the pressing faces 51 abut against the projecting pieces 28.

When the slider 4 returns to the initial position, the switch mechanisms 91 and 92 are both opened, so that it is judged that the card C is ejected from the card insertion space S1.

What is claimed is:

1. An electrical card connector for holding an inserted electrical card, the card having a plurality of surfaces, and preventing scratching of the surfaces of the inserted electrical card, comprising:

a body having a partition wall and parallel spaced apart frames extending from both ends of said partition wall, said partition wall and parallel spaced apart frames partly defining a card insertion space, said card insertion space defining card inserting and ejecting directions;

a slider mounted on said body so as to be slidable along said body in the card inserting and ejecting directions between an initial position and a pushed-in position;

spring means mounted to said housing for engaging said slider to bias said slider in said ejecting direction;

said slider having at least one arm formed as part of said slider, said at least one arm having a basal portion and a head portion including an engaging portion, said head portion protruding into said card insertion space, said engagement portion being engaged with the inserted electrical card when the card is inserted into said card insertion space and moved in the card insertion direction;

at least one contact piece member attached to said body, said at least one contact piece member having a basal portion, a curved section extending from said basal portion, said curved section having a top defining a contact portion, said basal portion and said curved section extending into said card insertion space, and a projecting piece situated adjacent to a side edge of said basal portion, said projecting piece extending parallel in the electrical card ejection direction, said contact portion having an external contact surface for contacting a surface of the inserted electrical card, said at least one contact piece member having elasticity for urging said contact portion into said card insertion space; and a contact position regulating mechanism comprising said projecting piece, an opening in said slider associated with each of said at least one contact piece member, and a pressing portion extending into said opening such that when said slider is in said initial position said pressing face overlaps said projecting piece preventing said projecting piece from being displaced upwardly into said opening by the elasticity of said at least one contact piece member, said opening allowing said projecting piece to be displaced upwardly therein as said slider slides from said initial position to said pushed-in position, wherein, in the middle of the insertion of an electrical card between said initial position and said pushed-in position, before an external contact forming region of the electrical card reaches the initial position opposing said contact of said contact piece member, a condition in which said pressing face overlaps said projecting piece is maintained, and, when the external contact forming region of the electrical card reaches the pushed in position opposing said contact of said contact piece member, said projecting piece extends into said opening.

2. An electrical card connector according to claim 1, wherein said at least one arm has elasticity, said engagement portion being cantilevered to said basal portion of said at least one arm, said head portion protruding in said card insertion space when said slider is at said initial position, said head portion having an upward sloped face which finctions as said engagement portion which is engaged with the tip end of the card, and an engagement pawl disposed on said head portion, and said body further having: a guide face on which said engagement pawl slides when said slider is pushed and moved by the card from said initial position to said pushed-in position, thereby preventing said head portion from being pressed by the card; an opening which is disposed adjacent to said guide face, and in which said engagement pawl of said head portion which is pushed against the elasticity of said arm by the card falls in said opening when said slider reaches said pushed-in position, thereby allowing said tip end of the card to ride over said head portion; and an engaging portion which engages said engagement pawl in the opening, in said card ejecting direction.

3. An electrical card connector according to claim 2, wherein said slider, said at least one arm, said head portion, and said engagement pawl are formed as an integrally molded body made of a synthetic resin.

4. An electrical card connector according to claim 3, wherein said electrical card connector is a multipolar electrical card connector comprising a number of said contact piece members.

5. An electrical card connector according to claim 2, further comprising:

a cover which engages said body, wherein said partition wall is a flat-plat partition wall which is disposed in said body, and a face of said cover which is mounted on said body opposing said partition wall partly defining said card insertion space, and wherein, when said engagement pawl is engaged with said engaging portion, the card is pressingly held in an elastic manner by said head portion which is elastically in contact with the card due to the elastic restoring force of said at least one arm and said cover.

6. An electrical card connector according to claim 5, wherein said electrical card connector is a multipolar electrical card connector comprising a number of said contact piece members.

7. An electrical card connector according to claim 1, further comprising:

a cover which engages said body, wherein said partition wall is a flat-plate partition wall which is disposed in said body, and a face of said cover which is mounted on said body opposing said partition wall partly defining said card insertion space, and wherein an opening through which said angled portion of said contact piece member passes is formed in said partition wall.

8. An electrical card connector according to claim 7, wherein said electrical card connector is a multipolar electrical card connector comprising a number of said contact piece members.

9. An electrical card connector according to claim 2, further comprising:

a cover which engages said body, wherein said partition wall is a flat-plate partition wall which is disposed in said body, and a face of said cover which is mounted on said body opposing said partition wall partly defining said card insertion space, and wherein an opening into which said head portion is loosely fitted is formed in said partition wall.

10. An electrical card connector according to claim 9, wherein said electrical card connector is a multipolar electrical card connector comprising a number of said contact piece members.

11. An electrical card connector according to claim 1, wherein said electrical card connector is a multipolar electrical card connector comprising a number of said contact piece members.

12. An electrical card connector according to claim 2, wherein said electrical card connector is a multipolar electrical card connector comprising a number of said contact piece members.

* * * * *

UNITED STATES PATENT AND TRADEMARK OFFICE
CERTIFICATE OF CORRECTION

PATENT NO. : 6,102,723
DATED : August 15, 2000
INVENTOR(S) : Toshihito Kusakabe et al It is certified that error appears in the above-indentified patent and that said Letters Patent is hereby corrected as shown below:

Claim 2, column 11, line 67, "finctions" should be --functions--.

Claim 5, column 12, line 27, "flat-plat" should be --flat-plate--.

Signed and Sealed this

Seventeenth Day of April, 2001

Attest:

NICHOLAS P. GODICI

*Attesting Officer*   *Acting Director of the United States Patent and Trademark Office*